April 15, 1947.　　　M. A. BOSTWICK　　　2,419,111

ELECTROSTATIC RELAY

Filed Oct. 22, 1942　　　3 Sheets-Sheet 1

WITNESSES:

INVENTOR
Myron A. Bostwick.
BY
ATTORNEY

April 15, 1947.　　　M. A. BOSTWICK　　　2,419,111
ELECTROSTATIC RELAY
Filed Oct. 22, 1942　　　3 Sheets-Sheet 2
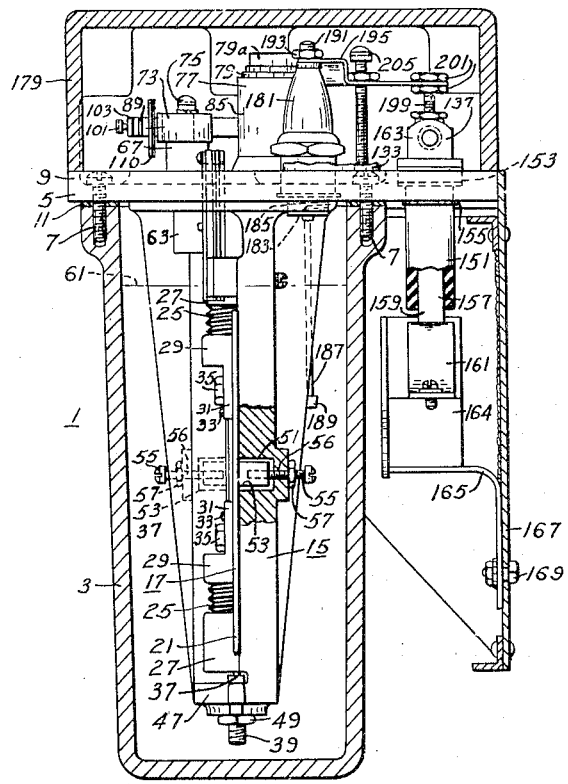
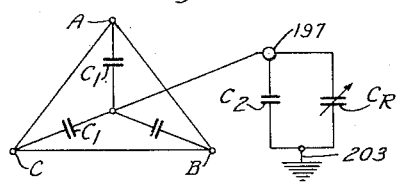
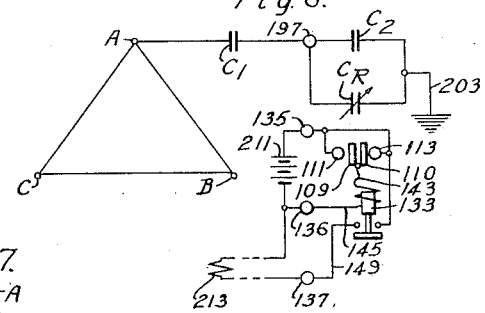
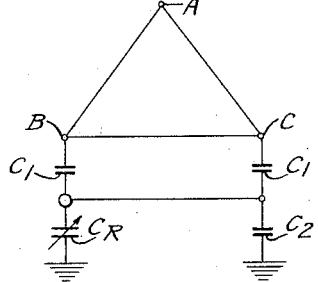
WITNESSES:
INVENTOR
Myron A. Bostwick.
BY
ATTORNEY April 15, 1947. M. A. BOSTWICK 2,419,111
ELECTROSTATIC RELAY
Filed Oct. 22, 1942 3 Sheets-Sheet 3
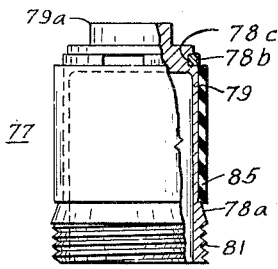
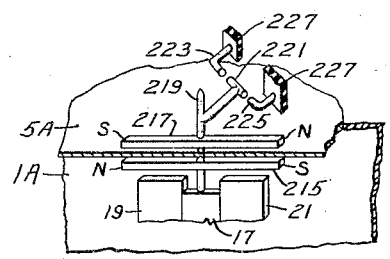
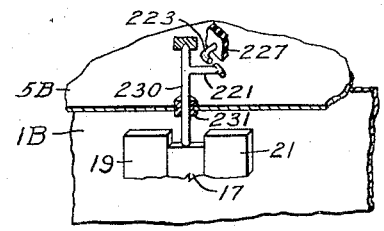
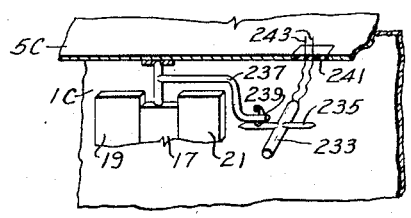
WITNESSES:
INVENTOR
Myron A. Bostwick.
BY
ATTORNEY Patented Apr. 15, 1947

2,419,111

UNITED STATES PATENT OFFICE 2,419,111

ELECTROSTATIC RELAY

Myron A. Bostwick, Budd Lake, N. J., assignor to Westinghouse Electric Corporation, East Pittsburgh, Pa., a corporation of Pennsylvania Application October 22, 1942, Serial No. 463,015

2 Claims. (Cl. 200—87)

This application relates to electrical relays and it has particular relation to electrical relays of the electrostatic type.

Electrostatic relays are well known in the art. As a specific example, reference may be made to the Bostwick et al. Patent 2,020,931, wherein an electrostatic relay is disclosed for controlling the tripping of a network protector in a network distribution system. However, because of the inability of the prior art to provide an electrostatic relay of simple and sturdy construction suitable for high voltage installations, the application of the electrostatic relay has been unduly restricted.

In accordance with the invention, a pair of relatively movable members between which an electrostatic field is produced are positioned in a sealed housing. This housing contains a dielectric fluid which preferably is a liquid. This liquid serves not only as a dielectric, but it also serves to insulate the members and to damp the relative movement thereof. Furthermore, the dielectric liquid renders the electrostatic relay substantially shock proof.

Although the dielectric liquid affords a substantial degree of insulation, the invention includes an insulating coating for the relatively movable members. This insulating coating guards against dielectric breakdowns caused by dust and air bubbles in the dielectric liquid.

The invention further contemplates the provision of circuit controlling mechanism positioned externally of the housing containing the relatively movable members. An operating force is transmitted from the relatively movable members to the circuit controlling mechanism by a magnetic coupling. The provision of such a coupling permits the utilization of a completely sealed housing for containing the dielectric liquid.

It is, therefore, an object of the invention to provide an improved electrostatic relay.

It is a further object of the invention to provide an electrostatic relay having relatively movable electroconductive plates immersed in a dielectric liquid contained in a sealed housing.

It is another object of the invention to provide an electrostatic relay having electroconductive plates immersed in a dielectric liquid and having an insulating coating on at least certain of the electroconductive plates.

It is a still further object of the invention to provide an electrostatic relay having relatively movable electroconductive plates and having circuit controlling mechanism coupled to the plates by means of a magnetic coupling.

Other objects of the invention will be apparent from the following description, taken in conjunction with the accompanying drawings, in which:

Fig. 3 is a view in side elevation with parts in section of the electrostatic relay illustrated in Fig. 1;

Fig. 4 is a detail view of a sealing cap suitable for the relay of Fig. 2;

Figs. 5, 6 and 7 are schematic views showing electrical coupling systems suitable for the electrostatic relay of Fig. 1;

Figs. 8, 9 and 10 are detail views in perspective with parts in section showing modified means for associating circuit completing mechanism with an electrostatic relay designed in accordance with the invention.

Figure 1:
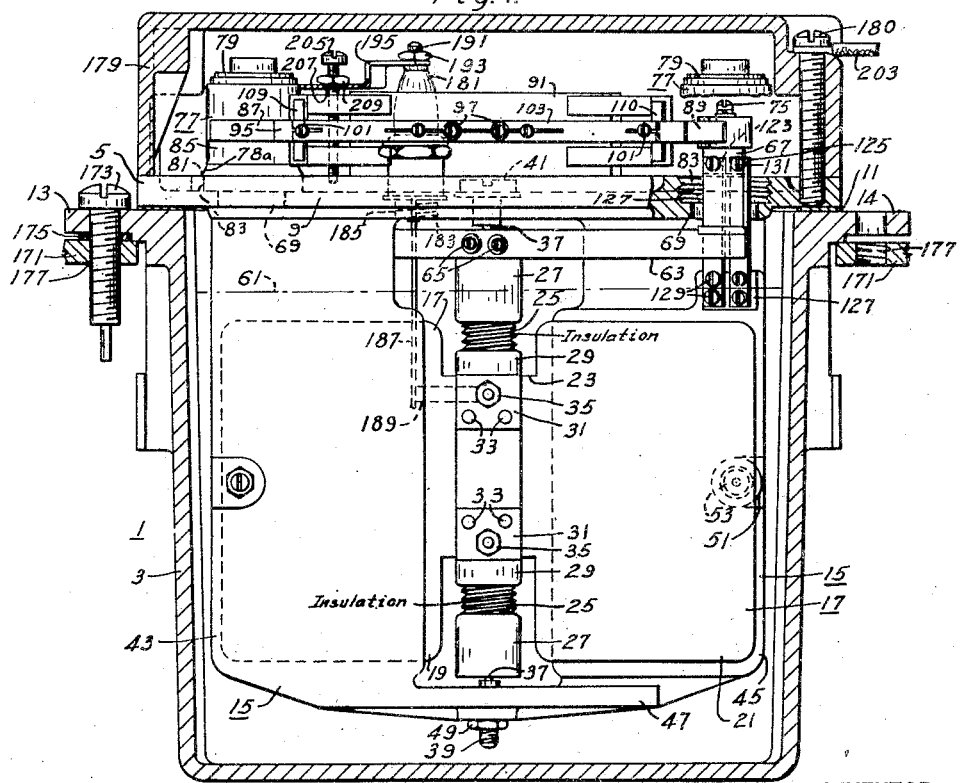
Figure 1 is a view in front elevation with parts in section of an electrostatic relay embodying the invention.

Referring to the drawings, Fig. 1 shows an electrostatic relay provided with a housing 1. This housing includes a cup-shaped base receptacle 3 having a cover 5 associated therewith. As shown more particularly in Figs. 2 and 3, the cover 5 may be attached to the base receptacle 3 by any suitable means, such as machine screws 7. It will be observed that the cover 5 is provided with a peripheral flange 9 which substantially increases the rigidity of the cover. The cover and base receptacle may be formed of any suitable material, such as aluminum or a die-cast alloy. To assure a good seal between the cover and the base receptacle, a gasket 11 may be placed therebetween. By inspection of Figs. 1 and 2, it will be observed that ears 13 and 14 are associated with the base receptacle 3. These ears facilitate the mounting of the electrostatic relay on any desired support.

The operating force for the electrostatic relay is provided by a fixed assembly 15 which is attached integrally or otherwise to the cover 5 and a movable assembly 17 which is mounted for rotation relative to the cover 5. The rotatable assembly 17 includes one or more electroconductive plates. Although the number of electrical conductive plates may vary appreciably, two plates 19 and 21 are illustrated in the specific embodiments of Figs. 1, 2, and 3. These plates may be stamped from a single sheet of suitable material, such as aluminum. A connecting portion 23 may be left between the two electroconductive plates.

To support the electroconductive plates 19 and 21 for rotation, a suitable shaft assembly is provided. Preferably, the shaft assembly insulates the electroconductive plates 19 and 21 from the remainder of the electrostatic relay. In the specific embodiment herein illustrated, a pair of threaded rods of insulating material 25 are provided. These rods may be formed of any suitable material such as phenolic resin. Each of the rods is provided at its ends with a pair of caps 27 and 29 which are in threaded engagement therewith. The caps 29 are provided with flanges 31 to which the movable assembly is attached in any suitable manner as by rivets 33 and bolts 35. The caps 27 are provided with shafts 37 which are received in bearings 39 and 41 carried by the cover 5.

The fixed assembly 15 is divided into two electroconductive plates 43 and 45, having surfaces respectively adjacent surfaces of the electroconductive plates 19 and 21 of the rotatable assembly. By inspection of Fig. 1, it will be observed that when an electrostatic field is established between the fixed assembly 15 and the rotatable assembly 17, each of the electroconductive plates 43 and 45 and its associated rotatable plate 19 or 21 develop a force urging the rotatable assembly in a common direction about its axis.

The fixed electroconductive plates 43 and 45 are bridged by an integral connecting member 47 which has a threaded opening for the reception of the bearing screw 39. A lock nut 49 may be provided for retaining the bearing screw 39 in any position of adjustment thereof.

The remaining bearing screw 41 may be received in a threaded opening in the cover 5. In this manner, the rotatable assembly 17 is mounted for rotation with respect to the fixed assembly 15 and is removable therewith as a unit from the base receptacle 3.

Since high voltages are to be applied between the fixed and movable electroconductive plates, it is desirable that stops be provided for accurately spacing these plates. For this purpose each of the fixed electroconductive plates is provided with a recess 51 (see Fig. 3) within which a stop member 53 is positioned. This stop member may be formed of any suitable insulating material such as a phenolic resin. To permit adjustment of the stop member 53, it is mounted in any suitable manner on a machine screw 55 which is received in a threaded opening 56 in the associated fixed electroconductive plate. A lock nut 57 may be provided for locking the machine screw 55 in any position to which it is adjusted. By inspection of Fig. 3, it will be observed that the stops 53 may be accurately positioned to determine the minimum space between the fixed electroconductive plates 43 and 45 and the respective movable electroconductive plates 19 and 21.

The housing 1 is filled with a fluid dielectric and preferably with a liquid dielectric to a level indicated by the line 61. Although the substance employed as a dielectric may vary appreciably, a hydrocarbon petroleum product, such as kerosene, has been employed with satisfactory results. As previously pointed out, the liquid dielectric serves not only as a dielectric but as a damping medium for the rotatable assembly 17 and as an insulating means. By suitable selection of the dielectric liquid, the time of response of the electrostatic relay may be varied substantially. Because of the presence of the dielectric liquid, the electrostatic relay is substantially immune to vibration and shock.

When the housing 1 contains a fluid dielectric, it is desirable that all electrical and mechanical connections to elements positioned within the housing be provided with satisfactory seals for preventing the escape or contamination of the dielectric fluid. To this end, the contacts for the electrostatic relay may be actuated from the rotatable assembly 17 through a magnetic coupling.

Referring to Fig. 1, it will be observed that a bar 63 is connected by any suitable means such as machine screws 65 to the cap 27 for rotation therewith. At its ends the bar 63 carries a pair of posts 67 which project through openings 69 in the cover 5. The bar 63 and posts 67 may be formed of aluminum. Each of the posts 67 has attached thereto a permanent magnet 71 or 73 by any suitable means such as a machine screw 75. These permanent magnets preferably are of high coercive material such as permanent magnet steel containing cobalt.

For housing the permanent magnets 71 and 73, a pair of caps 77 are provided each of which may comprise a cylindrical cup 79 of non-magnetic material, such as brass. This brass cup 79 may have male threads 81 for threaded reception in female threads 83 provided in the cover 5. If desired, each of the cups 79 may be provided with a cylindrical cover 85 of an insulating non-magnetic material such as a phenolic resin. The cover 85 may be secured in position in any suitable manner. In the illustrated embodiment (Fig. 4) the cover is secured between a flange 78a formed on the cup 79 and a resilient split ring 78b which is positioned in an annular slot 78c formed in the cup 79. By inspection of Figs. 1 and 2, it will be observed that rotation of the rotatable assembly 17 operated to move each of the permanent magnets 71 and 73 within its cup 79. Each cup 79 may be provided with an elongated rib 79a which may be engaged to facilitate rotation and removal of the cup.

For cooperation with the permanent magnets 71 and 73 a contact assembly is provided having magnetic arms 87 and 89 positioned respectively in the magnetic fields produced by the permanent magnets 71 and 73. This contact assembly may be secured to an insulating block 91 which is attached to the cover 5 in any suitable manner as by machine screws 93. The magnetic arms 87 and 89 may be attached in any suitable manner to the ends of a resilient strip 95 of any suitable material, such as bronze. This strip is secured to the insulating block 91 by means of machine screws 97 which are received in threaded bushings 99 affixed to the insulating block 91. For controlling the position and effective resiliency of the strip 95, a plurality of adjusting screws 101 are positioned in a bar 103 which also is secured to the insulating block 91 by the machine screws 97. Suitable spacers 105 and 107 are provided for spacing the strip 95 and the bar 103.

The magnetic arms 87 and 89 carry respectively, movable contacts 109 and 110 which cooperate with fixed contacts 111 and 113. The fixed contacts 111 and 113 may be carried by strips 115 of suitable material such as brass. These strips are secured to the insulating block 91 by means of machine screws 117. If desired, adjusting screws 119 and supports therefor may be provided for adjusting the positions of the fixed contacts 111 and 113. The resiliency of the strips 115 permits a sufficient range of adjustment for the fixed contacts.

It will be observed that movements of the permanent magnets 71 and 73 vary the distance between each permanent magnet and its associated magnetic arm 87 or 89. When the permanent magnet 71 or 73 is at its maximum distance from its associated magnetic arm 87 or 89, the magnetic force therebetween is insufficient to overcome the resiliency of the strip 95 and the associated contacts remain open. As each of the permanent magnets approaches its associated magnetic arm, a point is reached at which the magnetic force developed therebetween becomes large enough to overcome the resiliency of the strip 95, whereupon the associated movable contact moves into engagement with the associated fixed contact. Consequently, contact operation is provided without destroying the seal provided by the housing 1 for the fluid dielectric contained therein.

Since the magnetic force developed between each of the permanent magnets 71 and 73 and its associated magnetic arm increases as each magnetic arm and associated permanent magnet approach each other, a substantial force is required to separate each permanent magnet and its associated magnetic arm following a closing operation of the associated contacts. To reduce the operating force required for this purpose and to provide adequate control for the electrostatic relay, a plurality of control springs 121, 123 and 125 are provided. These springs may be each secured at one end to supports 127, formed on the fixed assembly 15, by means of machine screws 129. These springs extend substantially parallel to the posts 67 with their free ends projecting through the openings 69 formed in the cover 5. The posts 67 carry machine screws 131 which form adjustable abutments for engaging the associated springs 121, 123 and 125. By inspection of Fig. 1, it will be observed that the machine screws 131 may be adjusted following removal of the caps 77.

Figure 2:
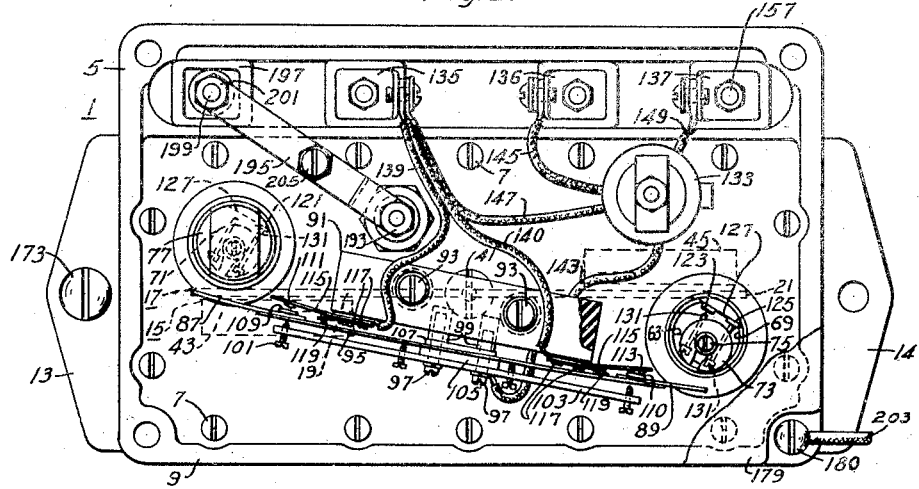
Fig. 2 is a view in top plan with parts removed of the electrostatic relay illustrated in Fig. 1.

When a voltage is applied between the fixed and rotatable assemblies 15 and 17, the electrostatic field therebetween produces a force urging the rotatable assembly 17 counterclockwise as viewed in Fig. 2. Counterclockwise rotation of the rotatable assembly 17 carries the permanent magnet 71 towards its associated magnetic arm 87. Consequently, the permanent magnet 71 may be termed an overvoltage magnet and the contacts 109 and 111 may be termed overvoltage contacts. This rotation of the rotatable assembly 17 is opposed by the control spring 125. By proper adjustment of the machine screw 131 associated with the control spring 125, the voltage at which the permanent magnets remain substantially equidistant from their magnetic arms 87 and 89 may be adjusted within suitable limits.

As the overvoltage permanent magnet 71 approaches its associated magnetic arm 87, a point is reached at which the control spring 123 is engaged by its associated machine screw 131. This control spring 123 introduces a force acting on the rotatable assembly 17 to oppose the increased magnetic force of attraction resulting from the close approach of the permanent magnet 71 to the associated magnetic arm 87. Since the control spring 123 tends to separate the overvoltage permanent magnet 71 from its associated magnetic arm 87, the control spring 123 may be referred to as an overvoltage kick-out spring.

When the voltage applied between the fixed and rotatable assemblies 15 and 17 decreases, the control spring 125 urges the rotatable assembly in a clockwise direction, as viewed in Fig. 2. Such movement of the rotatable assembly carries the permanent magnet 73 towards its associated magnetic arm 89. At some point in this approach, the magnetic force between the permanent magnet 73 and its associated magnetic arm 89 becomes sufficient to overcome the resiliency of the strip 95 and the contacts 110 and 113 thereupon close. For this reason, the permanent magnet 73 may be referred to as an undervoltage permanent magnet and the contacts 110 and 113 may be referred to as undervoltage contacts.

The clockwise rotation of the rotatable assembly also carries one of the machine screws 131 into engagement with the control spring 121. This control spring 121 produces a force opposing the force of attraction between the undervoltage magnet 73 and the associated magnetic arm 89. For this reason, the control spring 121 may be termed an undervoltage kick-out spring.

Although the contacts 109, 111, 110 and 113 may be employed directly for a control operation, a contactor 133 may be associated therewith as indicated in Fig. 2. This contactor may be of a well known solenoid-operated type. As shown in Fig. 2, conductors may extend between the contacts 109, 111, 110 and 113, the contactor 133 and terminals 135, 136 and 137. As a specific example of suitable contact connections, the fixed contacts 111 and 113 may be connected in parallel through conductors 139 and 140 to one of the terminals 135. The movable contacts 109 and 110 may be connected in parallel through a conductor 143 to the winding of the contactor 133. The remaining terminal of the winding of the contactor 133 may be connected through a conductor 145 to the terminal 136. The contacts of the contactor 133 may be connected through conductors 147 and 149 to the terminals 135 and 137. These connections will be discussed further with reference to Fig. 5.

The terminals 135, 136 and 137 may be of any suitable form. As illustrated more particularly in Fig. 3, each of these terminals may include an insulating sleeve 151 of any suitable material such as a phenolic resin. This sleeve extends through the cover 5 and is provided with an enlarged head 153 for restricting axial movement thereof. A collar 155 is attached to the insulating sleeve 151 in any suitable manner on the side of the cover 5 opposite the head 153 to prevent axial movement of the insulating sleeve. A conductor 157 extends through the sleeve 151 and terminates at one end in a contact blade 159. This contact blade 159 is designed for reception in a contact jaw 161. The opposite end of the conductor 157 may be attached to a terminal lug 163. The contact jaws 161 may be carried by suitable insulating structures 164 which are mounted on brackets 165. These brackets 165 are illustrated as attached to a support 167 by means of suitable bolts 169.

The support 167 also includes flanges 171 to which the electrostatic relay may be attached. Referring to Fig. 1, it will be observed that the flanges 171 support the ears 13 and 14. Each of these ears is provided with a jack screw 173 having a collar 175 attached thereto in any suitable manner to restrict axial movement of the screw with respect to the associated ears. These jack screws are received in threaded openings 177 provided in the flanges 171. By inspection of Fig. 1, it will be observed that rotation of the jack screws 173 positively moves the electrostatic relay towards or away from the associated flanges 171. The contact blade and jaw construction of the terminals is described more fully in the Smith et al. Patent 2,254,920.

Preferably, the contacts of the electrostatic relay are provided with a suitable cup-shaped enclosure 179 which may be attached to the cover 5 in any suitable manner as by machine screws 180. By removal of the enclosure 179, the various contacts may be inspected and serviced as required without opening the housing 1.

For applying a voltage between the fixed and rotatable assemblies 15 and 17, an insulating bushing 181 is provided having a threaded sleeve 183 for securing the bushing in a threaded opening 185 provided in the cover 5. This bushing 181 has a central conductor 187 which extends into the housing 1 where it is connected by means of a conductive flexible strip 189 to the electroconductive plates 19 and 21. This connection may be effected through the bolt 35.

At its opposite end, the conductor 187 is provided with threads 191. A nut 193 may be associated therewith for attaching thereto a conductive strap 195. This conductive strap connects the conductor 187 to a terminal 197 which is similar generally in construction to the terminals 135 to 137. However, in place of the lug 163 employed for the terminals 135, 136, and 137, the terminal 197 has a threaded extension 199 to which the strap 195 is secured by means of nuts 201.

The circuit for the fixed and rotatable assemblies 17 and 19 may be completed by establishing a suitable connection to the cover 5. Generally, this connection is a grounding connection which places the entire housing 1 with its cover 5 and enclosure 179 at ground potential. This connection is represented in Fig. 1 by a ground conductor 203 which is attached to the electrostatic relay in any suitable manner as by one of the machine screws 180.

Since the electrostatic relay is designed for high voltage operation, a high degree of insulation is desirable between the parts thereof which operate at substantial voltage differences. As previously pointed out, the dielectric liquid provided in the housing 1 also serves as an insulating medium. Furthermore, it is desirable to coat either the electroconductive plates 19 and 21 or the fixed plates 43 and 45 with an insulating coating such as a phenolic resin. Such a coating tends to decrease the possibility of dielectric breakdown resulting from the presence of dust or air bubbles in the liquid. In the specific embodiment herein discussed, it is assumed that all of the plates 19, 21, 43 and 45 are coated with such an insulating coating.

As a further guard against insulation failure, a spark gap may be provided. Such a spark gap may take the form of a machine screw 205 which is received in a threaded opening 207 provided in the conductive strap 195. A lock nut 209 may be provided for retaining the machine screw 205 in any position to which it is adjusted. By suitable adjustment of the machine screw 205, the gap between the lower end of the machine screw, as viewed in Fig. 1 and the cover 5, may be adjusted to break down at the desired voltage.

The electrostatic relay illustrated in Figs. 1, 2 and 3 may be coupled to an electrical system in various ways. A number of suitable couplings for such a relay are illustrated in the aforesaid Bostwick et al. patent. Additional coupling systems are illustrated in Figs. 4, 5 and 6.

Referring to Fig. 4, three phase conductors A, B and C of a three-phase electrical circuit are illustrated at the three points of an equilateral triangle to indicate the delta voltages between the conductors in a conventional manner. An electrostatic relay designed in accordance with the invention and represented by a variable capacitor $C_R$ is connected to the phase conductors A, B and C through three coupling capacitors $C_1$. An additional capacitor $C_2$ is illustrated as connected in parallel with the electrostatic relay. The electrostatic relay $C_R$ is represented as a variable capacitor for the reason that the capacitance between the fixed and movable plates of the electrostatic relay varies in accordance with the relative separation of these plates.

With the connections illustrated in Fig. 4, the electrostatic relay is energized in accordance with the zero sequence voltage component of the three-phase circuit. For this reason, the voltage across the electrostatic relay under normal operating conditions is substantially zero. Consequently, the electrostatic relay does not require undervoltage contacts and it may be designed only for response to overvoltage.

When a ground fault occurs on any of the phase conductors, a voltage appears across the electrostatic relay which may be represented by the following expression $$E_R = \frac{\sqrt{3}E_L C_1}{3C_1 + C_2 + C_R}$$

In this expression $E_R$ represents the voltage across the electrostatic relay when a ground fault occurs on one of the conductors, $E_L$ represents the phase-to-phase voltage of the three-phase circuit.

In Fig. 5, the electrostatic relay represented by the variable capacitor $C_R$ and its parallel capacitor $C_2$ are connected through a coupling capacitor $C_1$ to one of the phase conductors A. When a phase-to-ground fault occurs on the phase conductor A, the voltage across the electrostatic relay may be represented by the following expression:

$$E_R = 0$$

When a phase-to-ground fault occurs on either of the phase conductors B or C, the voltage across the electrostatic relay may be represented by the following expression:

$$E_R = \frac{E_L C_1}{C_1 + C_2 + C_R}$$

Consequently, both the overvoltage and undervoltage contacts of the electrostatic relay may be employed for control purposes. These contacts are illustrated in schematic form in Fig. 5.

As shown in Fig. 6, a suitable energizing source, such as an electrical battery 211, is connected to the terminals 135 and 136 of the electrostatic relay. A device to be operated, such as the trip coil 213 of a circuit breaker, is connected between the terminals 136 and 137 of the electrostatic relay.

It is believed that the operation of the electrostatic relay is clear from the foregoing discussion. Under normal conditions of operation of the system illustrated in Fig. 5, a voltage is applied to the electrostatic relay which maintains the permanent magnets 71 and 73 substantially equidistant from their associated magnetic arms 87 and 89. Consequently, both pairs of contacts 109, 111 and 110, 113 are open. Should the voltage applied to the electrostatic relay decrease, as in response to a fault-to-ground occurring on the phase conductor A, the electrostatic force developed between the movable electroconductive plates 19 and 21 and the fixed plate 43 and 45 decreases. In response to this decrease, the control spring 125 urges the undervoltage magnet 73 towards its associated magnetic arm 89. At a predetermined point, the permanent magnet 73 attracts the magnetic arm 89 sufficiently to close the contacts 110 and 113. As shown in Fig. 5, closure of the contacts 110 and 113 completes an energizing circuit for the winding of the contactor 133. The contactor thereupon picks up to close its contacts and energize the trip coil 213.

Should the voltage across the electrostatic relay increase as in response to a phase-to-ground fault occurring on one of the conductors C or B, the electrostatic force developed between the fixed and movable plates increases to an extent sufficient to close the contacts 109 and 111. In response to such closure, the energizing winding of the contactor 133 is energized to complete a circuit for the tripping coil 213.

A still further coupling system for the electrostatic relay is illustrated in Fig. 6. With a system as illustrated in Fig. 6, a phase-to-ground fault on the phase conductor A results in an application to the electrostatic relay of a voltage represented by the following expression:

$$E_R = \frac{\sqrt{3} E_L C_1}{2C_1 + C_2 + C_R}$$

A phase-to-ground fault on either of the phase conductors B or C results in an application to the electrostatic relay of a voltage represented by the expression:

$$E_R = \frac{E_L C_1}{2C_1 + C_2 + C_R}$$

Although a preferred magnetic coupling is illustrated in Figs. 1, 2 and 3, for actuating the relay contacts several modified constructions are illustrated in Figs. 8, 9 and 10. In Fig. 8, the rotatable assembly 17 has attached thereto a magnetic bar 215 having north and south poles represented by the reference characters N and S. The rotatable assembly 17 is enclosed in a housing 1A similar to that of Figs. 1, 2 and 3. This housing 1A is provided with a cover 5A of non-magnetic material corresponding to the cover 5 of Figs. 1, 2 and 3. External to the housing a second permanent magnet 217 is mounted for rotation on a shaft 219. The permanent magnet 217 has north and south poles which again are represented by the reference characters N and S. Since the permanent magnets 215 and 217 are mounted with the smallest spacing possible between the poles thereof, movement by one of the permanent magnets is accompanied by movement of the remaining permanent magnet. The shaft 219 may carry a movable contact 221 for engaging fixed contacts 223 and 225. The fixed contacts may be mounted on suitable insulating supports 227. The construction of Fig. 8 is somewhat less desirable for the reason that the relatively loose coupling between the permanent magnets and the high inertia of the moving parts makes the assembly somewhat subject to operation by mechanical shock.

Alternatively, a shaft 230 which supports the rotatable assembly 17 (Fig. 9) may be extended through the cover 5B which corresponds to the cover 5 of Figs. 1, 2 and 3 through an oil seal bearing 231. It will be understood that the rotatable assembly 17 is positioned within a housing 1B which otherwise corresponds to the housing 2 of Fig. 1. Although such a construction may be operated successfully, it is objectionable for the reason that some oil and air leakage takes place through the bearing 231. It should be observed that any increase in bearing friction resulting from an attempt to decrease the leakage through the bearing is objectionable for the reason that such an increase in friction objectionably loads the rotatable assembly 17.

In the modification illustrated in Fig. 10, the rotatable assembly 17 also is enclosed in a housing 1C corresponding to the housing 1 of Figs. 1, 2 and 3. A switch of suitable design, such as a mercury switch 233, is mounted in the same housing. As a specific example, the switch may be mounted for rotation on a shaft 235. Rotation of the shaft is effected by an arm 237 attached to the rotatable assembly 17. This arm passes through an eye 239 carried by the shaft 235. Connections from the switch may be carried by flexible conductors through the cover 5C which corresponds to the cover 5 of Figure 1, 2 and 3. A suitable insulating material, such as rubber or a phenolic resin 241, may be employed for sealing the opening through which the conductors 243 from the switch pass. For many applications such a construction is less desirable than that illustrated in Figs. 1, 2 and 3 for the reason that substantial energy is required to actuate the switch 233.

Although the invention has been described with reference to certain specific embodiments thereof, numerous modifications thereof are possible. Therefore, the invention is to be restricted only by the appended claims as interpreted in view of the prior art.

I claim as my invention:

1. In a relay device, a pair of spaced electroconductive plates, means mounting said electroconductive plates for movement relative to each other, means for establishing an electrical field between said electroconductive plates, said electrical field operating to urge one of said electroconductive plates relative to the other of said electroconductive plates in a predetermined direction, a completely sealed housing for said electroconductive plates, and circuit controlling means responsive to the relative movement of said members, said circuit controlling means comprising a pair of permanent magnets, means mounting said permanent magnets for movement within said housing in accordance with relative movement of said electroconductive plates, said housing having a non-magnetic wall positioned adjacent each of said permanent magnets for permitting passage of magnetic flux from each of said permanent magnets therethrough, and control means positioned exteriorly of said housing, said control means having a separate magnetic operating member positioned in the path of magnetic flux from each of said permanent magnets for actuating said control means in accordance with movement of each of said permanent magnets, each of said magnetic operating members being positioned for operative attraction by its associated permanent magnet in response to relative movement of said electroconductive plates in a separate direction.

2. In a relay device, a pair of spaced electroconductive plates, means mounting said electroconductive plates for movement relative to each other, means for establishing an electrical field between said electroconductive plates, said electrical field operating to urge one of said electroconductive plates relative to the other of said electroconductive plates in a predetermined direction, an insulating coating on one of said electroconductive plates, means biasing said electroconductive plates in opposition to the force developed by said electrical field, a completely sealed housing for said electroconductive plates, an insulating liquid in said housing within which said electroconductive plates are immersed, said insulating liquid operating as a fluid dielectric body between said electroconductive plates, and circuit controlling means responsive to the relative movement of said members, said circuit controlling means comprising a pair of permanent magnets, means mounting said permanent magnets for movement within said housing in accordance with relative movement of said electroconductive plates, said housing having a non-magnetic wall positioned adjacent each of said permanent magnets for permitting passage of magnetic flux from each of said permanent magnets therethrough, and control means positioned exteriorly of said housing, said control means having a separate magnetic operating member positioned in the path of magnetic flux from each of said permanent magnets for actuating said control means in accordance with movement of each of said permanent magnets, each of said magnetic operating members being positioned for operative attraction by its associated permanent magnet in response to relative movement of said electroconductive plates in a separate direction, and resilient means opposing attraction of each of said magnetic operating members by its associated permanent magnet.

MYRON A. BOSTWICK.

REFERENCES CITED

The following references are of record in the file of this patent:

UNITED STATES PATENTS

| Number | Name | Date |
|---|---|---|
| 1,408,738 | Hill | Mar. 7, 1922 |
| 1,061,919 | Miller | May 13, 1913 |
| 1,403,701 | McCullough | Jan. 17, 1922 |
| 1,605,911 | Banneitz | Nov. 9, 1926 |
| 2,028,893 | Bondurant | Jan. 28, 1936 |

FOREIGN PATENTS

| Number | Country | Date |
|---|---|---|
| 383,595 | British | Nov. 17, 1932 |